Jan. 29, 1963   F. C. WORTH   3,075,457
MARKING APPARATUS
Filed Jan. 29, 1960   3 Sheets-Sheet 1
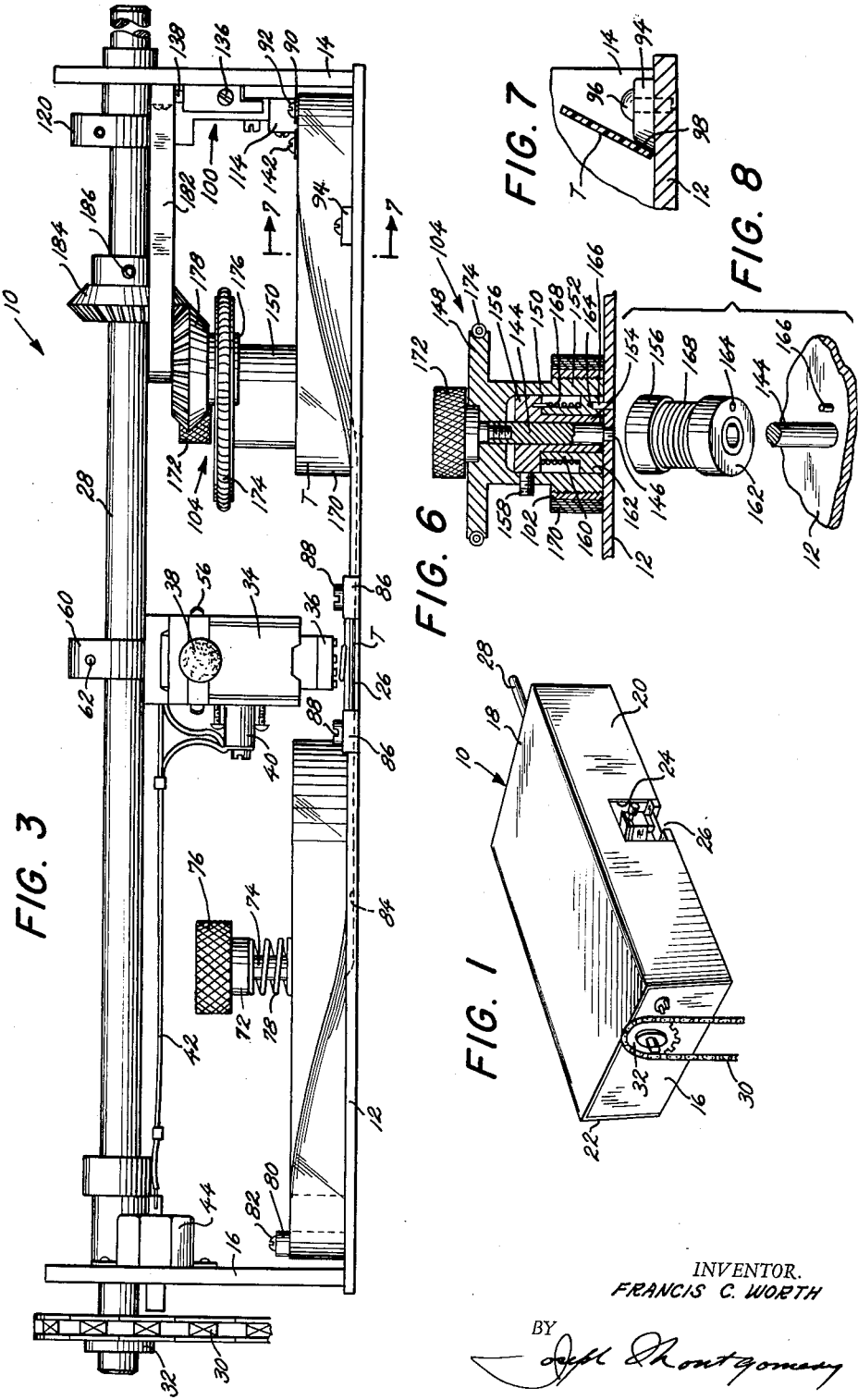
INVENTOR.
FRANCIS C. WORTH
BY
ATTORNEY Jan. 29, 1963  F. C. WORTH  3,075,457
MARKING APPARATUS
Filed Jan. 29, 1960  3 Sheets-Sheet 2
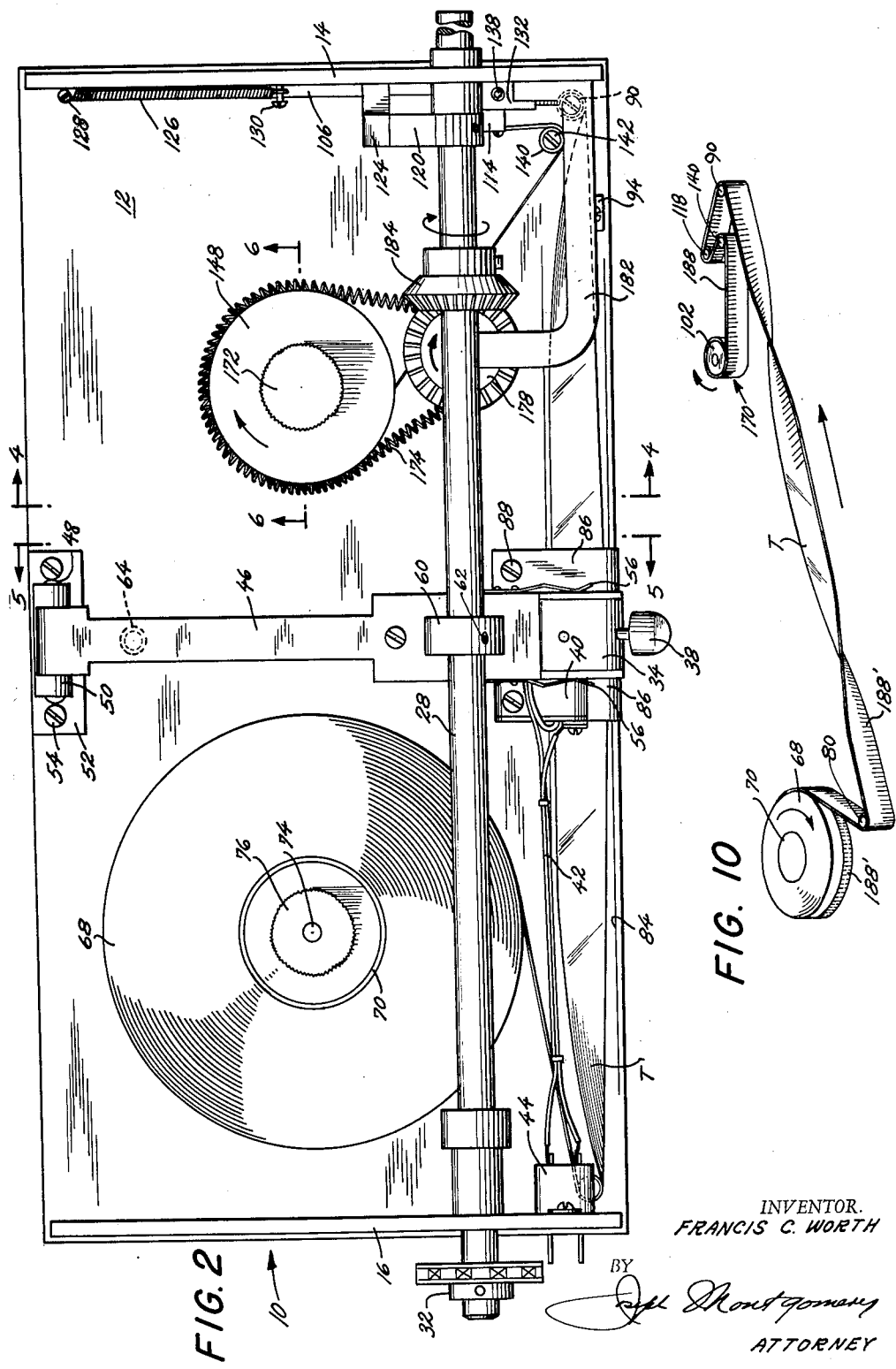
INVENTOR.
FRANCIS C. WORTH
BY
ATTORNEY Jan. 29, 1963
F. C. WORTH
3,075,457
MARKING APPARATUS
Filed Jan. 29, 1960
3 Sheets-Sheet 3
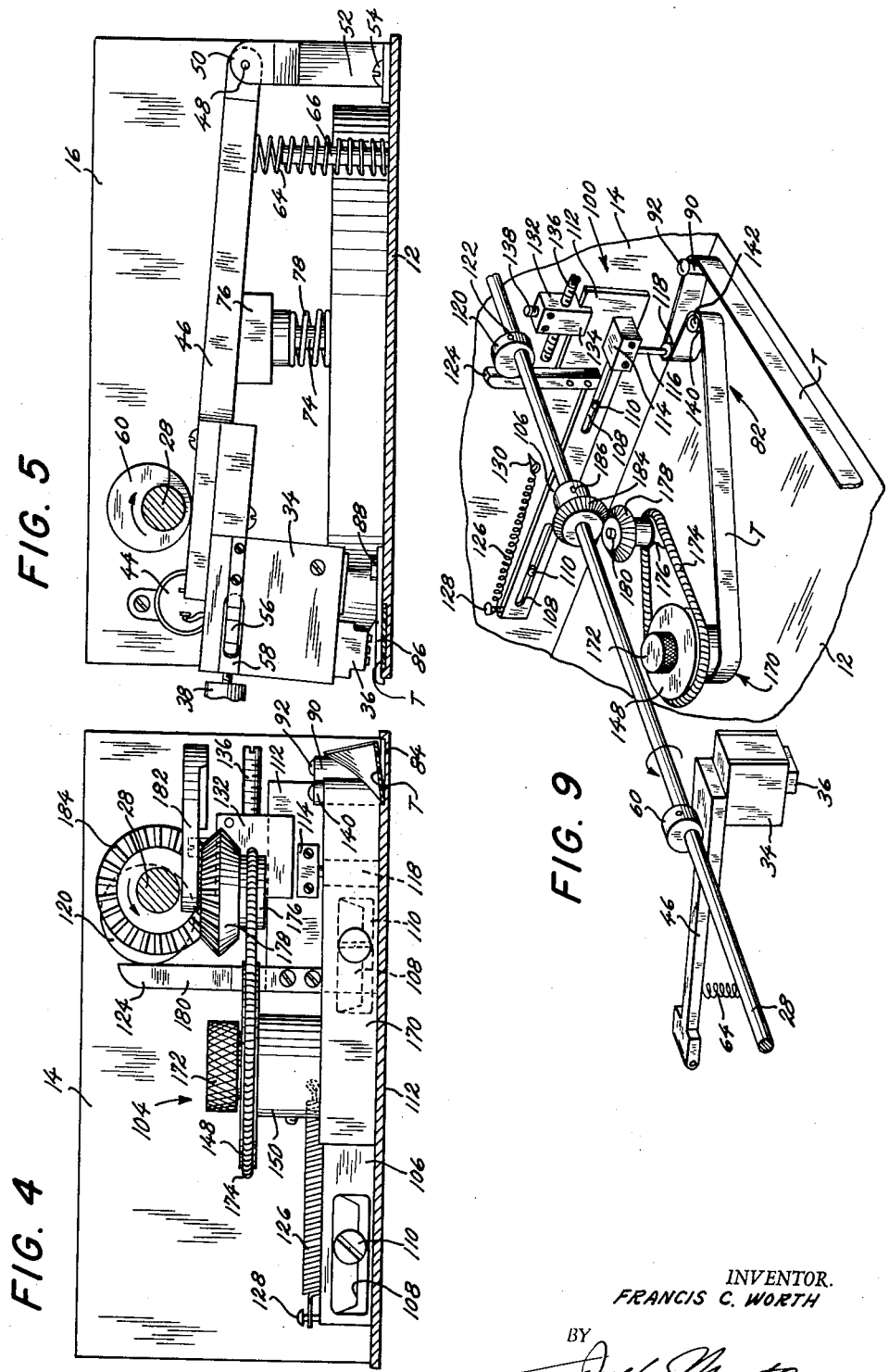
INVENTOR.
FRANCIS C. WORTH
BY 
ATTORNEY Уnited States Patent Office 3,075,457
Patented Jan. 29, 1963

3,075,457
MARKING APPARATUS
Francis C. Worth, Ridgewood, N.Y., assignor to Adolph Gottscho, Inc., Hillside, N.J., a corporation of New York
Filed Jan. 29, 1960, Ser. No. 5,398
8 Claims. (Cl. 101—27)

The present invention relates generally to marking apparatus, and more particularly is directed to an apparatus for applying markings in the form of price, date-code or other indicia to a web of cellophane, waxed paper or other wrapping material from a hot roll leaf stamping tape by means of a heated die having raised type and which presses the tape against the wrapping material while the latter is suitably supported.

It is an object of the invention to provide an improved apparatus for applying indelible markings to an intermittently advanced continuous web or sheet of wrapping material or the like as the latter is fed to a wrapping or other machine that utilizes the same.

Although the apparatus embodying the present invention has many uses, a particularly advantageous use thereof is in connection with the marking of the cellophane, waxed paper or other wrapping material in which bread and other baked products are usually enclosed in order to preserve the freshness thereof. Since bread or other baked products are relatively soft or yielding, it has been found that the usual hand stamping procedure employed for marking prices on articles offered for sale in supermarkets cannot be effectively employed for marking prices on wrapped bread or other baked products. Thus, it is necessary that the price be applied to the wrapping material at the baker prior to the enclosure of the bread or other baked products therein. Similarly, date-code markings must also be applied to the wrapping material prior to the enclosure of the bread or other baked products therein.

Since inked impressions do not ahere very well to the glossy surface of cellophane and are easily removed from waxed paper, it has been previously proposed to mark such wrapping materials from a hot roll leaf stamping tape by means of a heated die which has raised type and presses the tape against the wrapping material while the latter is suitably supported. When cellophane is being marked, the heat and pressure applied to the roll leaf stamping tape causes the immediate deposit of a permanent impression upon the cellophane, which impression has the same size and shape as the raised type of the heated die. When applying markings to waxed paper, the heat from the die melts the wax coating, and the pigment of the tape in the areas corresponding to the raised type, so that the marking or impression penetrates to the surface of the paper and immediate permanent adhesion of the marking is obtained.

In a marking apparatus employing hot roll leaf stamping tape for the application of permanent markings to a continuous web of cellophane or waxed paper as the latter is intermittently advanced to a wrapping or other machine that utilizes the same, it is necessary that the raised type of the heated die press the tape against the wrapping material when the latter is at rest during the interval between successive advancements thereof, and that the heated die be moved away from the tape during advancement of the wrapping material, at which time the tape is simultaneously fed in order to expose an unused part thereof to the action of the raised type of the heated die during the next marking operation. In existing marking apparatus employing hot roll leaf stamping tape, some difficulty has been experienced in obtaining the proper coordination of the movements of the heated die with the feeding movements of the tape and the intermittent advancement of the wrapping material.

Accordingly, it is an object of the present invention to provide an improved marking apparatus employing hot roll leaf stamping tape for the marking of cellophane or waxed paper, and wherein the movements of the heated die carrying the raised type which press the tape against the cellophane or waxed paper while the latter is at rest are accurately coordinated with the feeding movements of the tape and with the intermittent advancement of the cellophane or waxed paper.

In marking apparatus of the described character, the hot roll leaf stamping tape is conveniently drawn from a supply spool or reel and rewound on a take-up spool or reel after the transfer of markings from the tape to the intermittently advanced wrapping material. However, since the tape must be at rest during each marking operation, the feeding of the tape from the supply spool or reel to the take-up spool or reel is in an intermittent or step-by-step manner, and considerable difficulty has been experienced in achieving the uniform tensioning of the tape and the even and uniform rewinding thereof on the take-up spool or reel.

Accordingly, it is another object of the present invention to provide an improved mechanism in a marking apparatus of the described character for effecting the intermittent feeding movements of the tape and the uniform rewinding thereof on the take-up spool or reel.

In accordance with an aspect of the present invention, the supply spool or reel is provided with a yieldable friction brake which avoids the free unwinding of the tape therefrom, and a pull is intermittently exerted on the tape, at a location intermediate the heated die and the take-up spool or reel, with the latter being yieldably driven in the direction for rewinding the tape thereon and being provided with a device which prevents rotation of the take-up spool or reel in the opposite direction so as to ensure that the pull exerted on the tape will cause unwinding of the latter from the supply spool or reel.

Another object is to provide a marking apparatus of the described character with a mechanism for feeding the hot roll leaf stamping tape past the heated die in an intermittent or step-by-step manner, with such mechanism being adjustable so as to vary the length of the tape which is fed during each operation thereof, thereby to permit such length to be made to correspond to the area covered by the raised type of the heated die for avoiding waste of the tape.

Still another object is to provide a marking apparatus of the described character wherein the movements of the heated die and the feeding movements of the hot roll leaf stamping tape are both controlled by cams on a common driven shaft, thereby to ensure the accurate coordination of such movements.

A still further object is to provide a marking apparatus of the described character wherein means are provided whereby, when one edge of the hot roll leaf stamping tape has been used and the tape is wound upon the take-up spool or reel, the supply and take-up reels can be reversed and inverted whereby the unused edge of the tape may then be used so that a single supply roll of tape can be run through the apparatus twice without requiring the rewinding of the tape on the supply reel.

The above, and other objects, feature sand advantages of the invention, will be apparent in the following detailed description of an illustrative embodiment thereof which is to be read in connection with the accompanying drawings forming a part hereof, and wherein:

FIG. 1 is a perspective view of a marking apparatus embodying the present invention;

FIG. 2 is a top plan view of the apparatus of FIG. 1, but on an enlarged scale and with the cover removed;

FIG. 3 is a front elevational view of the marking apparatus of FIG. 2;

FIG. 4 is a transverse sectional view taken along the line 4—4 of FIG. 2;

FIG. 5 is a transverse sectional view taken along the line 5—5 of FIG. 2;

FIG. 6 is a detailed sectional view taken along the line 6—6 of FIG. 2;

FIG. 7 is an enlarged detailed sectional view taken along the line 7—7 of FIG. 3;

FIG. 8 is an exploded perspective view of parts included in the assembly illustrated in FIG. 6;

FIG. 9 is a perspective view of interrelated operating components included in the marking apparatus embodying the invention; and FIG. 10 is a schematic view illustrating the course followed by the hot roll leaf stamping tape in the marking apparatus embodying the present invention.

Referring to the drawings in detail, and initially to FIGS. 1, 2 and 3 thereof, it will be seen that a marking apparatus embodying the present invention and there generally identified by the reference numeral 10 includes a housing having a generally rectangular bottom wall 12, side walls 14 and 16 projecting upwardly from bottom wall 12 along the opposite end edges of the latter, and a removable cover having a top wall 18, a front wall 20 and a back wall 22. Front wall 20 of the removable cover is formed with a central cutout 24 opening at the bottom edge thereof, and bottom wall 12 is formed with a central cutout 26 opening at the front edge thereof so that, when the removable cover is in its normal position closing the housing, the cutouts 24 and 26 respectively provide convenient access to the heated die hereinafter described in detail and permit the raised type of that heated die to press the hot roll leaf stamping tape extending across cutout 26 against a continuous web of cellophane, waxed paper or other wrapping material which is intermittently advanced along a path extending under the housing of the marking apparatus and suitably supported, for example, by a resilient platen (not shown), in the region under cutout 26.

It is to be understood that the marking apparatus 10 is intended for use in connection with a wrapping or other machine which utilizes the continuous web of cellophane, waxed paper or other wrapping material, for example, the type 3–22 bread wrapper produced by American Machine and Foundry Company, Brooklyn, New York, which includes an infeed tunnel in which the marking apparatus can be conveniently supported.

The marking apparatus 10 further includes a drive shaft 28 extending parallel to bottom wall 12 above the latter and rotatably journalled adjacent its opposite ends in side walls 14 and 16. In order to synchronize the operation of marking apparatus 10 with the intermittent advancement of the continuous web of wrapping material under bottom wall 12, drive shaft 28 is preferably driven from a timing or drive shaft (not shown) of the associated wrapping or other machine, for example, by way of a continuous chain 30 running around a sprocket 32 fixed on one end of shaft 28. In the illustrated embodiment of the invention, the shaft 28 is rotated in the clockwise direction, as viewed from the end thereof rotatably supported in side wall 14.

A die 34 in the form of a metal block is disposed above cutout 26 of bottom wall 12 and has a downwardly opening recess for accommodating type or impression members 36 which project downwardly therefrom and have raised surfaces corresponding to the desired marking to be applied. The type members 36 are releasably held within the downwardly opening recess of block 34 by means of a set screw 38 which is screwed into the block and has a knob on its outer end. Block 34 further contains an electric heating element 40 (FIG. 3) which is supplied with energizing electric current by way of conductors 42 extending to a plug 44 carried by side wall 16 and adapted for separable connection to a corresponding female receptacle (not shown) connected to electric supply lines.

An arm 46 preferably formed of an insulating material, for example, Bakelite or the like, is disposed parallel to side walls 14 and 16 and has its forward end portion extending under shaft 28. The back end of arm 46 is pivoted on a horizontal pin 48 extending between a pair of lugs 50 which are formed at the upper end of a post 52 secured, as by screws 54, to bottom wall 12 adjacent the back edge of the latter. Thus, arm 46 is swingable in a vertical plane and releasably carries heated die or block 34 at its forward end. In order to releasably suspend block 34 from the forward end of arm 46, the latter is provided with two spaced apart spring clips 56 extending forwardly from the arm and received in elongated recesses 58 formed in the opposite sides of block 34 adjacent the top of the latter.

Swinging movements of arm 46 for raising and lowering block 34 and the type members 36 carried by the latter are controlled by a radial cam 60 which is adjustably secured on shaft 28, for example, by a set screw 62 (FIG. 3), and which is engageable with the top surface of arm 46 adjacent the forward end of the latter. A helical compression spring 64 is guided by an upstanding post 66 extending from bottom wall 12 in front of post 52, and the upper end of spring 64 acts upwardly against the undersurface of arm 46 so as to yieldably urge the latter into continuous engagement with rotated cam 60. Accordingly, as shaft 28 is rotated, in synchronism with the intermittent advancement of a web of wrapping material under bottom wall 12, heated die or block 34 is periodically raised and lowered and, when block 34 is in its lower-most position, the raised surfaces of type member 36 act downwardly against the length of the tape T extending across cutout 26 so as to press the tape against the underlying wrapping material, whereby the combination of heat and pressure thus applied to the tape causes the permanent transfer of pigment from the tape to the wrapping material.

In the apparatus 10 embodying the invention, the tape T to be fed intermittently over cutout 26 of bottom wall 12 is drawn from a supply roll 68 carried by a supply spool or reel 70 which is mounted for rotation about a vertical axis between arm 46 and side wall 16. The rotatable mounting for spool 70 preferably includes a spindle adaptor 72 which fits into reel or spool 70 and is rotatable on a spindle 74 projecting upwardly from bottom wall 12 and having a screw threaded upper end portion. A knurled knob or nut 76 is threaded on spindle 74, and a helical compression spring 78 extends around spindle 74 between nut 76 and the top surface of adaptor 72 so that spring 78 acts as a frictional brake resisting free unwinding of supply roll 68 with a force depending upon the adjusted position of knob or nut 76. The knob or nut 76 may be conveniently held in adjusted position along spindle 74 by forming the latter with a longitudinal slot extending diametrically thereacross so that the threads of spindle 74 are normally urged into tight frictional engagement with the internal threads of knob 76.

The tape from supply roll 68 is drawn tangentially from the latter in the direction toward side wall 16 and there passes around a bushing 80, preferably of Teflon or nylon, which is rotatable on a screw 82 extending vertically from bottom wall 12. After passing around bushing 80, the tape T is directed across the front edge portion of bottom wall 12 and is twisted into a horizontal plane near the center of the bottom wall where the tape passes between cutout 26 and type member 36. In order to receive the horizontally disposed portion of tape T, bottom wall 12 is provided with a groove 84 formed in its top surface and extending parallel to the front edge of bottom wall 12. Tape T is retained within groove 84 in a horizontal position by a pair of guides 86 which are secured to the top surface of bottom wall 12, as by screws 88, and which extend forwardly over the tape in groove 84 at locations disposed at the opposite sides of cutout 26. The guides 86 have their forward ends turned down over the front edge of bottom wall 12 so as to prevent the forward removal of the tape from guide 84.

After passing between cutout 26 and type member 36, the tape T passes around a guide bushing 90 which is also preferably formed of Teflon or nylon and is rotatable about a vertical screw 92 projecting upwardly from bottom wall 12 adjacent side wall 14, whereby the tape is returned to a vertical position. In order to prevent the tape from folding forwardly when it is pulled around bushing 90, there is provided a guide member 94 secured, as by a screw 96, to the top surface of bottom wall 12 at a location adjacent the path of tape T between guides 88 and bushing 90 and formed with an inclined back edge surface 98 (FIG. 7) to engage the tape T from in front.

After passing around guide bushing 90, the tape T is acted upon by a tape pulling mechanism generally identified by the reference numeral 100 and is then rewound on a take-up spool or reel 102 (FIG. 6) which is rotatably driven by a take-up mechanism generally identified by the reference numeral 104, with the tape pulling mechanism 100 and the take-up mechanism 104 cooperating to effect the intermittent movement of the tape over cutout 26 between guides 86 and to effect the uniform rewinding of the tape on the spool or reel 102.

As shown in FIG. 9, the tape pulling mechanism 100 includes an elongated slide member 106 disposed against the inside surface of side wall 14 and having a pair of axially spaced apart, aligned slots 108 receiving screws 110 projecting from side wall 14 so that slide member 106 is free to move longitudinally toward and away from the guide bushing 90. The forward end of slide member 106 is formed with a plate-like enlargement 112 having a block 114 secured to its inner surface and carrying a depending vertical shaft 116 on which a movable guide bushing 118, preferably of teflon or nylon, is rotatably mounted.

A cam 120 is fixed on drive shaft 28, for example, by a set screw 122, at a location above the slide member 106, and is engaged, from in back, by a cam follower 124 in the form of a bar secured to enlargement 112 of slide member 106 and projecting upwardly therefrom. A helical tension spring 126 is connected, at its opposite ends, to a pin 128 carried by the back end of slide member 106 and to a pin 130 projecting from side wall 14, and the spring 126 is effective to yieldably urge slide member 106 forwardly, thereby to move cam follower 124 against the periphery of radial cam 120. Thus, as shaft 28 is rotated, cam 120 effects the longitudinal reciprocation of slide member 106 in order to periodically increase and decrease the distance between the fixed axis of guide bushing 90 and the movable axis of guide bushing 118.

In order to permit adjustment of the distance traveled by slide member 106 during its reciprocation, without necessitating the replacement of cam 120, the tape pulling mechanism 100 further includes a block 132 secured to the inner surface of side wall 114 above the enlargement 112 of slide member 106 and having a depending lip 134 which extends over the upper edge of enlargement 112 to further steady slide member 106 during its longitudinal reciprocation. An adjustable stop 136 is provided in the form of a screw threadably extending through block 132 parallel to the direction of movement of slide member 106 and engageable, at its back end, by cam follower 124. It will be apparent that stop 136 can be adjusted so as to be engaged by cam follower 124 prior to the positioning of slide member 106 at its foremost position, as determined by cam 120. Thus, the stroke of slide member 106 can be adjustably decreased from a maximum value determined exclusively by the configuration of radial cam 120. Block 132 further carries a set screw 138 which is engageable with the screw forming stop 136 in order to prevent inadvertent movement of the latter from an adjusted position.

A guide bushing 140, preferably formed of Teflon or nylon, is rotatably mounted on a vertical screw 142 extending upwardly from bottom wall 12 at a location which is disposed rearwardly and inwardly with respect to the guide bushing 90, and with the path of movement of the guide bushing 118 extending between the locations of the fixed guide bushings 90 and 140. The tape T extends rearwardly from guide bushing 90, and then passes around the back portion of guide bushing 118 before passing around the front portion of guide bushing 140. Thus, as guide bushing 118 moves rearwardly in response to the corresponding movement of slide member 106, the length of the tape between guide bushings 90 and 140 is increased and, conversely, the length of the tape between the fixed guide bushings 90 and 140 is decreased in response to forward movement of guide bushing 118.

After passing around guide bushing 140, the tape T is wound on the take-up spool or reel 102 driven by the take-up mechanism 104.

Referring to FIG. 6, it will be seen that the take-up mechanism 104 includes a vertical spindle 144 having a reduced diameter extension 146 at its lower end which is rotatably received in a suitable opening formed in bottom wall 12 at a location intermediate side wall 14 and arm 46. A pulley 148 is provided with a central opening receiving the upper end of spindle 144 and has a hollow shaft 150 depending therefrom concentric with spindle 144. Shaft 150 has an enlarged diameter lower portion 152 which fits closely into take-up spool or reel 102 and is formed with axially extending serrations adapted to grip the internal surface of the spool or reel so as to cause the latter to rotate with shaft 150. A tubular member 154 is rotatable on spindle 144 within hollow shaft 150 and is formed with an enlarged diameter head 156 at its upper end fitting closely within the interior of shaft 150 and rotatably coupled to the latter by means of a set screw 158. An outer tubular member 160 is rotatable on tubular member 154 and is formed with an enlarged diameter base 162 having a downwardly opening socket 164 adapted to receive a pin 166 projecting upwardly from bottom wall 12 so as to prevent rotation of the outer tubular member 160. A helical spring 168 surrounds tubular member 160 between head 156 and base 162 and is connected, at one end, to head 156 so as to rotate with pulley 148 and shaft 150. The coil spring 168 is dimensioned so that it is in frictional engagement with the outer surface of tubular member 160, and the coils thereof are wound so that, when pulley 148 is rotated in the direction for winding the tape on the take-up spool or reel 102, that is, in the clockwise direction as viewed in FIG. 2, the frictional drag on coil spring 168 resisting the rotation thereof with head 156 tends to increase the internal diameter of the coil spring in order to maintain a low frictional resistance to rotation of the take-up spool or reel in the tape rewinding direction. However, if a force is exerted tending to turn pulley 148, shaft 150 and take-up spool or reel 102 in the counter-clockwise direction, as viewed in FIG. 2, that is, in the direction tending to unwind the tape from the take-up reel, the frictional drag on spring 168 tends to twist the latter in the direction causing a reduction in the diameter of the spring, whereby the latter tightly grips the non-rotatable tubular member 160 to prevent rotation of the reel 102 in the unwinding direction.

From the above, it is apparent that the above described construction of the take-up mechanism permits rotation of the take-up reel 102 only in the direction for rewinding the tape so as to form a rewound roll 170 of used tape on the reel 102.

The pulley 148, which is removably held on spindle 144 by means of a screw 172 having a knurled head, is rotatably driven by means of an endless spiral spring type belt 174 which passes around pulley 148 in a peripheral groove of the latter and also runs around a grooved drive pulley 176. The drive pulley 176 is integral with a bevel gear 178 disposed thereabove and having a vertical axle 180 projecting upwardly therefrom and rotatably mounted in the end of an arm 182 which extends from a side wall 14 under drive shaft 28. Thus, bevel gear 178 and pulley 176 are mounted under drive shaft 28 for rotation about a vertical axis extending through the axis of rotation of the horizontal drive shaft, and a bevel gear 184 is fixed on shaft 28, for example, by a set screw 186, and meshes with bevel gear 178 in order to effect rotation of the latter.

It will be apparent that the spring belt 174 forms a yieldable transmission between drive pulley 176 and pulley 148 so that the drive pulley may be continuously rotated from drive shaft 28 while pulley 148 is only intermittently turned. Thus, when guide bushing 118 moves rearwardly with slide member 106 of the tape pulling mechanism 100 in order to exert a pull on the tape T between the fixed guide bushings 90 and 140, such pull tend to halt the rotation of pulley 148 with the drive pulley 176, while the spring 168 acts to prevent reverse rotation of the take-up reel 102, in the manner previously described. Accordingly, the pull exerted by the movable bushing 118 is then effective to draw a predetermined length of the tape T past the cut-out 26 of the bottom wall underlying the type or impression member 36. During the forward movement of movable bushing 118 with slide member 106, the consequent slackening of the tape is taken up by the action of the spring belt 174 which then causes turning of pulley 148 through an angular extent which is greater than the angular extent of movement of the drive pulley 176 during the same increment of time. With the above described cooperation of the tape pulling mechanism 100 and the take-up mechanism 104, the tape is moved in a step-by-step manner across cutout 26, in order to expose an unused portion of the tape T to the type member 36 during each marking operation, and the used tape is uniformly rewound upon the take-up reel 102.

Since the take-up mechanism is driven from the bevel gear 184 on drive shaft 28 and the tape pulling mechanism 100 is actuated by the cam 120 on the same shaft, it is apparent that the operations of the take-up mechanism and of the tape pulling mechanism will be accurately coordinated with the movements of the heated die 34 controlled by the cam 60 which is also secured on drive shaft 28.

In the apparatus 10 embodying the present invention, the raised type of type member 36 are engageable with only the forward half of the tape T passing over cutout 26 between guides 86. Further, as illustrated schematically in FIG. 10, when the tape is rewound upon the take-up reel or spool 102, the edge portion which has been used and which is designated by the reference numeral 188, is disposed uppermost. Accordingly, after all of the tape has been unwound from the supply reel or spool 70 and rewound upon the take-up spool or reel 102, the spools 70 and 102 can be removed and reversed with the spool 102 then being located on the spindle adaptor 72 and the spool 70 then being located on the enlarged diameter lower portion 152 of shaft 150. Such reversal of the spools 70 and 102 locates the used portion of the tape wound on spool 102 at the bottom of the latter, which then acts as the supply spool or reel. When the used edge portion of the tape is disposed at the bottom of the supply spool or reel, as indicated at 188' on FIG. 10, the described arrangement for guiding the tape over cutout 26 ensures that the remaining unused edge portion of the tape will then be disposed under the type member 36. Accordingly, a single supply roll of hot roll leaf stamping tape can be run through the apparatus twice without requiring the rewinding thereof.

Although an illustrative embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What is claimed is:

1. A marking apparatus comprising a base plate, a pair of upstanding end plates at the opposite ends of said base plate, an elongated drive shaft journalled in said end plates and disposed generally parallel to the base plate, a supply spool for carrying a roll of hot roll leaf stamping tape removably mounted on the base plate, a friction brake for yieldably resisting rotation of said supply spool, an impression carrying arm pivotally mounted on the base plate, cam means on said drive shaft operating the impression carrying arm, a one-way rotatable take-up reel mounted on the base plate, drive means interconnecting said drive shaft and said take-up reel and including elastically yieldable transmission means permitting said drive shaft to rotate while said take-up reel is held at rest and operative to store driving energy during such relative rotation of the drive shaft and take-up reel for transmission to the latter when said take-up reel is free to rotate, a tape-pulling mechanism carried by said base plate and one of said end plates and engageable with the tape at a location along the latter between said impression carrying arm and said take-up reel, and cam means interconnecting said tape-pulling mechanism and said drive shaft for operating the tape pulling mechanism so as to intermittently pull a predetermined length of tape under the impression carrying arm and simultaneously resist rotation of said take-up reel 2. A marking apparatus as in claim 1; wherein said one-way rotatable take-up reel includes an upstanding spindle, a cylindrical shaft rotatably mounted on said spindle and carrying said take-up reel, and a one-way clutch mechanism interconnecting said cylindrical shaft and the base plate for preventing rotation of the cylindrical shaft in one direction while permitting rotation in the other direction; and wherein said transmission means includes a pulley on said cylindrical shaft having a peripheral groove thereon, a supporting bracket disposed adjacent the pulley and rotatably carrying a first bevel gear, a second bevel gear mounted on said drive shaft in meshing engagement with said first bevel, said first bevel gear having a pulley thereon in alignment with said pulley rotatably mounted on the spindle, and an endless spiral spring belt encircling the pulleys for driving the pulley on said spindle from said pulley carried by the first bevel gear.

3. A marking apparatus comprising a base plate, a pair of upstanding end plates at the opposite ends of said base plate, an elongated drive shaft journalled in said end plates and disposed generally parallel to said base plate, a supply spool for carrying a roll of hot roll leaf stamping tape removably mounted on the base plate, a friction brake for yieldably resisting rotation of said supply spool, an impression carrying arm pivotally mounted on the base plate, cam means on said drive shaft operating the impression carrying arm, a one-way rotatable take-up reel mounted on the base plate, drive means interconnecting said drive shaft and said take-up reel, tape pulling mechanism including a pair of stationary pins disposed adjacent one end of the base plate and arranged in diagonally spaced relation on the base plate, with the tape extending over the outermost pin and then inwardly and reversing itself and then over the outer surface of the innermost pin thereby defining a loop, a movable pin disposed in the loop and a horizontally disposed and slidable slide member mounted on one of said end plates and carrying said movable pin, said slide member having an upstanding follower, and cam means driven by said drive shaft and engaging the follower for causing reciprocation of the slide member, whereby the one-way rotation of the take-up reel will cause the reciprocation of the movable pin to pull a predetermined length of tape under the impression carrying arm.

4. A marking apparatus as in claim 3; wherein an adjustment screw is supported on said one end plate and has one end thereof disposed for engagement by said follower for limiting the movement of the follower towards the related cam means whereby the distance of movement of the follower may be varied by the adjustment screw to adjust the length of the tape pulled under the impression carrying arm.

5. A marking apparatus as in claim 4; wherein said base plate is provided with a guide lug disposed adjacent said outermost stationary pin and having an inclined surface engaging the bottom edge of the tape for assuring that the tape will pass over said pins in a flat condition.

6. A marking apparatus as in claim 5; wherein the tape is wound on the take-up reel in a tangential direction opposed to a tangential direction from which the tape is pulled from the supply spool, whereby said reel and spool may be reversed and inverted so that the edge portion of the tape previously passing under the impression carried by the arm, and thus used, will then be spaced from the impression while the unused portion of the tape passes under the impression, so that the tape will be completely consumed only when passed twice under the impression carrying arm.

7. A marking apparatus for applying markings from hot roll leaf stamping tape onto an intermittently advanced surface; said apparatus comprising a rotatable supply spool for carrying a supply roll of the tape, a rotatable take-up spool for rewinding the used tape, guide means engageable with the tape between said supply and take-up spools to dispose an intermediate portion of the tape in a plane parallel and adjacent to the surface to be marked, a heated die carrying impression means, means movably mounting said die for movement of said impression means against and away from said intermediate portion of the tape, clutch means acting on said take-up spool to permit rotation of the latter only in the direction for rewinding the used tape thereon, a rotated drive shaft, means on said drive shaft operative to actuate said die for effecting said movement of the impression means, drive means for urging the takeup spool to rotate in said direction including a drive pulley driven from said shaft, a driven pulley rotatably coupled to said take-up spool and an endless, elastically extensible belt running around said drive pulley and driven pulley, a reciprocable tape pulling member acting on the tape at a location between said intermediate portion and said take-up spool to periodically increase and decrease the length of the path followed by the tape between said guide means and said take-up spool, and means driven by said drive shaft to reciprocate said tape pulling member through an adjustably predetermined stroke so that, during increase in said length of the path followed by the tape by said tape pulling member, the consequent pull on the tape halts rotation of the take-up spool by said drive means and a predetermined length of the tape is fed through said guide means while said elastically extensible belt stores energy for subsequent relatively rapid rotation of said take-up spool upon the following decrease in the length of said path followed by the tape.

8. A marking apparatus as is claim 7; wherein said means driven by the drive shaft to reciprocate the tape pulling member includes a cam on said drive shaft, a follower engageable with said cam and connected to said tape pulling member, spring means urging said follower toward said cam, and adjustable screw means operative to adjustably limit the movement of said follower toward the cam so that the reciprocating stroke of said tape pulling member is adjustable by manipulation of said screw means.

References Cited in the file of this patent
UNITED STATES PATENTS

| | | |
|---|---|---|
| 224,666 | Emerson | Feb. 17, 1880 |
| 1,304,854 | Clark | May 27, 1919 |
| 1,411,789 | Kellogg | Apr. 4, 1922 |
| 1,826,498 | Bignell | Oct. 6, 1931 |
| 1,860,729 | Braund | May 31, 1932 |
| 2,053,473 | Gould et al. | Sept. 8, 1936 |
| 2,173,048 | Von Madaler et al. | Sept. 12, 1939 |